May 3, 1932.  A. E. ARMSTRONG  1,856,451
VALVE MECHANISM
Filed Dec. 3, 1928  2 Sheets-Sheet 2

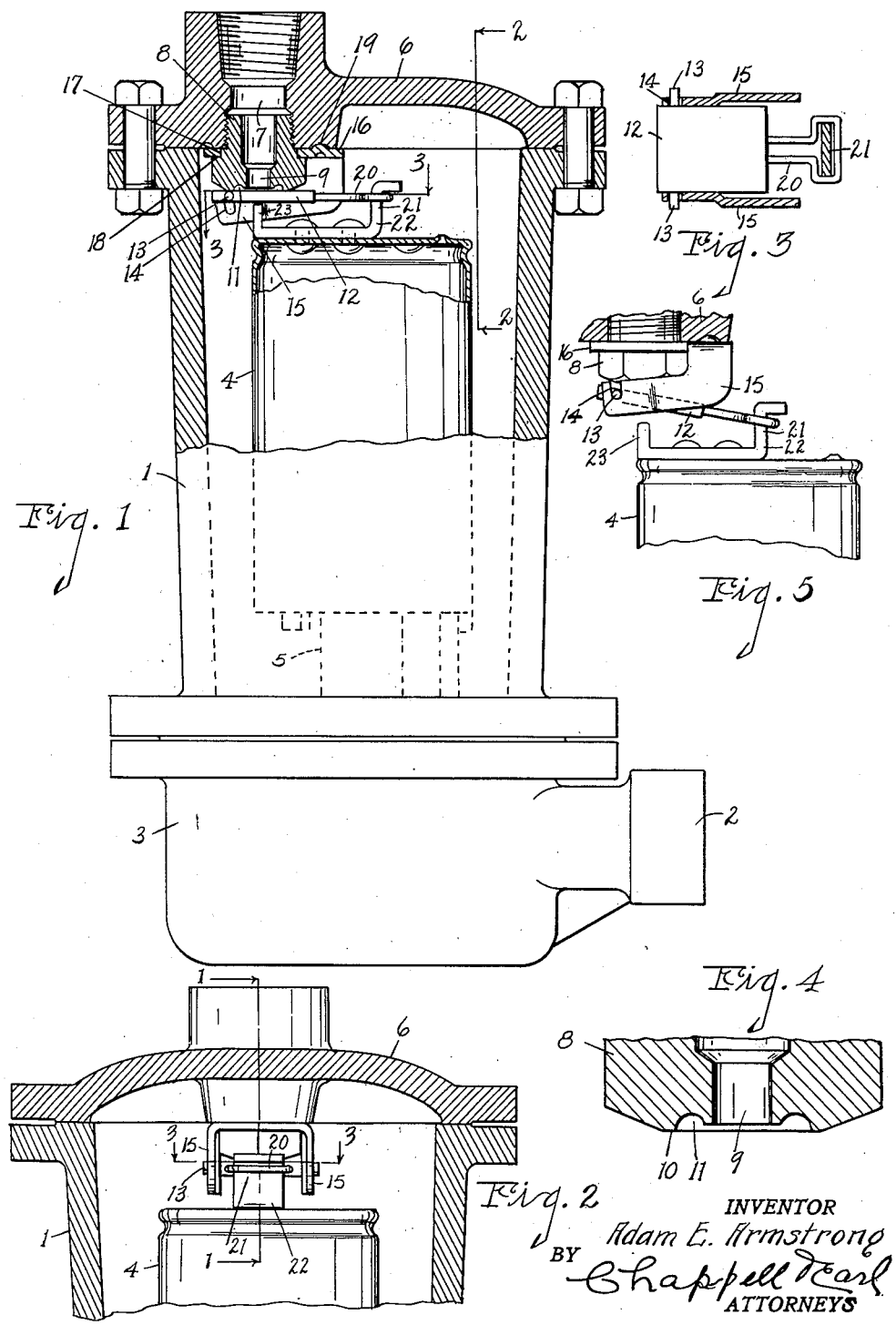

INVENTOR
Adam E. Armstrong
BY Chappell & Earl
ATTORNEYS

Patented May 3, 1932

1,856,451

UNITED STATES PATENT OFFICE

ADAM E. ARMSTRONG, OF THREE RIVERS, MICHIGAN, ASSIGNOR TO ARMSTRONG MACHINE WORKS, OF THREE RIVERS, MICHIGAN

VALVE MECHANISM

Application filed December 3, 1928. Serial No. 323,235.

The main objects of this invention are:

First, to provide in a steam trap an improved discharge valve mechanism which is very easily opened even under high pressures and at the same time the valve is effective and durable.

Second, to provide an improved valve which opens and closes without fluttering or chattering.

Objects pertaining to details and economies of my invention will definitely appear from the description to follow. The invention is defined in the claims.

A structure which is a preferred embodiment of my invention is clearly illustrated in the accompanying drawings, in which:

Fig. 1 is a detail view partially in vertical central section on a line corresponding to line 1—1 of Fig. 2, of a steam trap embodying the features of my invention, the parts being shown with the valve in closed position.

Fig. 2 is a detail section on line 2—2 of Fig. 1.

Fig. 3 is a detail horizontal section on line 3—3 of Figs. 1 and 2.

Fig. 4 is an enlarged detail of the valve seat member.

Fig. 5 is a fragmentary view showing the valve open.

Figure 6:
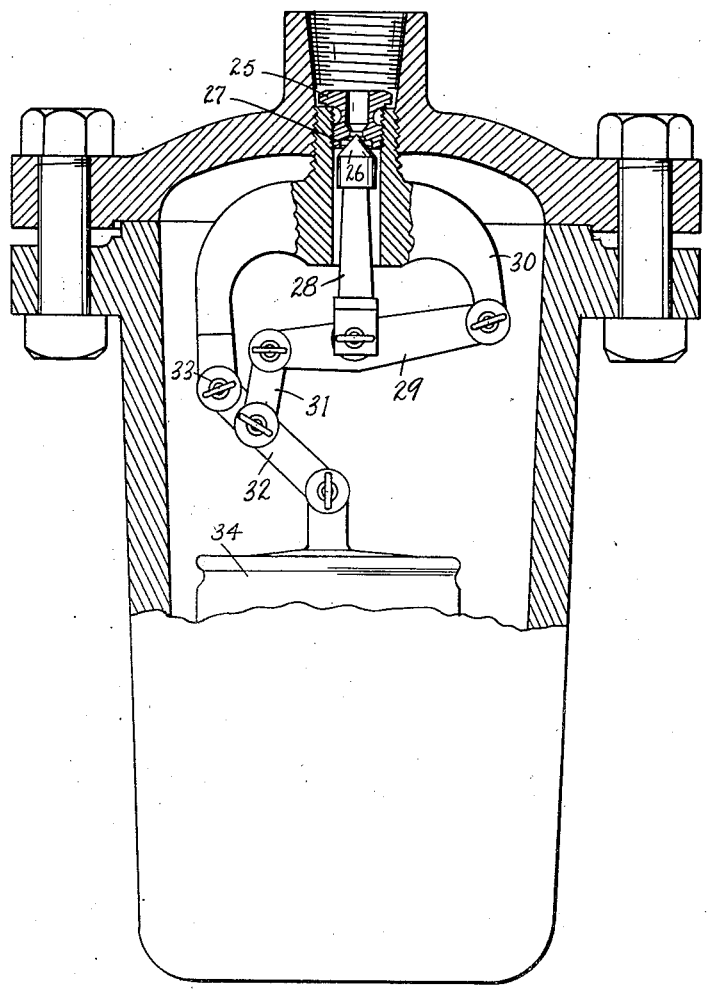
Fig. 6 is a modified form or embodiment showing another form of valve embodying my invention.

Referring to the drawings, the float chamber 1 is provided with an intake 2 delivering to a separating chamber 3. The separating chamber delivers to the inner side of the inverted bucket float 4 through a pipe 5. The float 4 is of the inverted type shown in Letters Patent No. 1,309,604 granted to me under date of July 15, 1919. The top 6 of the float chamber has a discharge passage 7 therein. Into this passage I thread a valve seat member 8 having a central port 9 therein surrounded by the annular valve seat 10. Between the valve seat and the port is an annular channel-like recess 11 opening to the port. The advantage of this will be pointed out later.

The valve 12 is in the form of a plate or disk and is provided with laterally projecting pins 13 which engage the vertical slots 14 in the angled supporting arms 15 which depend from an attaching plate 16 having an opening 17 therein through which the valve seat member is arranged. The valve seat member is shouldered at 18 to receive this attaching plate. In practice this shoulder is of such depth that the attaching plate does not prevent the full seating of the valve seat member.

A lug 19 struck up from the support member engages a corresponding recess in the float chamber top to prevent rotative movement of the support. The slots 14 are positioned so that the valve may fulcrum on the edge of the valve seat in opening and closing. The valve seat member is inclined upwardly from the edge of the valve seat permitting this tilting or fulcruming of the valve on the valve seat.

The valve is provided with an arm 20 formed of wire in the embodiment illustrated and conformed to provide an opening 21 at the outer end of the arm. The float 4 has an upwardly projecting hooked arm 22 which loosely engages in the opening 21 so that when the float falls the valve is tilted on the edge of the valve seat. A thrust member 23 on the float engages the valves centrally thereof to facilitate seating of the valve on the raising of the float.

The pins 13 on the valve loosely engage the slots 14 so that the valve may tilt freely on the valve seat without binding in the slots, the supports, however, preventing any substantial sliding movement of the valve and also supporting the valve when it drops from the seat, as may occur when water is flowing through the port.

The recess 11 in the face of the valve seat increases the area on the upper side of the valve exposed to the water so that on the initial opening or "cracking" of the valve the rush of water through the opening and around the valve does not reseat it, but the opening movement continues until the valve is fully opened.

Figure 7:
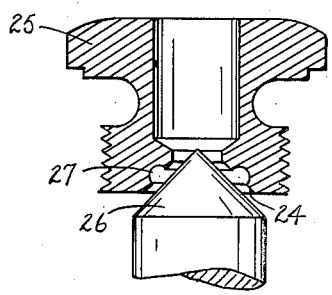
Fig. 7 is a fragmentary detail view with the valve open.

In the modification shown in Figs. 6 and 7 I have shown this feature as applied to another type of valve. The valve seat 24 in the valve seat member 25 is conical to coact with the conical valve 26. The valve seat 24 has an annular recess 27 in the face thereof which, as soon as the valve 26 "cracks", opens a substantial surface to the water so that the valve is not carried to its seat by the rush of water.

The valve 26 is provided with a stem 28 connected to the lever 29 pivoted on one arm of the yoke-like support 30. The lever 29 is connected by the link 31 to a lever 32 pivoted at 33 on the other arm of the yoke-like support, the float 34 being connected to the free end of the lever 32. This provides a compact lever for the valve.

My improvements are well adapted for embodiment in small traps, the parts are simple and economical to produce, easily assembled and are very durable in use. I have illustrated and described my improvements in forms or embodiments which I have found very practical. It is believed this disclosure will enable those skilled in the art to embody or adapt my improvements as may be desired.

Having thus described my invention what I claim as new and desire to secure by Letters Patent is:

1. The combination with a float chamber provided with an inlet at the bottom and a discharge passage at the top, of a shouldered valve seat member threaded into said discharge passage and having an annular downwardly facing valve seat, said valve seat member being inclined upwardly from the outer edge of the valve seat, an angled valve support provided with an attaching plate engaged with said shoulder of said valve seat member and having a lug engaging a coacting recess in the float chamber wall, said support being provided with a pair of spaced arms disposed at the side of the valve seat and having vertical slots therein, a disk valve provided with laterally projecting pins loosely engaging said slots and with an arm having an opening at its outer end, said pins being positioned to permit the tilting of the valve on one edge of the valve seat, and an inverted float disposed over said inlet and having an upwardly projecting centrally disposed hooked arm loosely engaging said opening in said arm on said valve.

2. The combination with a float chamber provided with an inlet at the bottom and a discharge passage at the top, of a valve seat member having an annular downwardly facing valve seat, said valve seat member being inclined upwardly from the outer edge of the valve seat, a valve support provided with a pair of spaced arms disposed at the side of the valve seat and having vertical slots therein, a disk valve provided with laterally projecting pins loosely engaging said slots and with an arm having an opening at its outer end, said pins being positioned to permit the tilting of the valve on one edge of the valve seat, and an inverted float disposed over said inlet and having an upwardly projecting centrally disposed hooked arm loosely engaging said opening in said arm on said valve.

3. The combination with a float chamber, of a valve seat member having an annular downwardly facing valve seat and an annular recess in the face of the valve seat communicating with its port, said valve seat member being inclined upwardly from the outer edge of the valve seat, a disk valve provided with laterally projecting pins and with an arm, a support with which said pins on said valve are loosely engaged permitting the tilting of the valve on the valve seat and permitting the valve to drop away from said valve seat, and an inverted float loosely connected to said arm on said valve whereby the valve is opened on the falling of the float.

4. The combination with a float chamber, of a downwardly facing discharge valve seat, a valve support having vertical slots therein, a disk valve provided with laterally projecting pins loosely engaging said slots and with an arm having openings at its end, said pins being positioned to permit the tilting of the valve on one edge of the valve seat, a float having an upwardly projecting arm loosely engaging said opening in said arm on said valve, and a thrust member on said float adapted to engage said valve centrally thereof.

5. The combination with a float chamber, of a downwardly facing discharge valve seat, a valve support having vertical slots therein, a disk valve provided with laterally projecting pins loosely engaging said slots and with an arm having openings at its end, said pins being positioned to permit the tilting of the valve on one edge of the valve seat, and a float having an upwardly projecting arm loosely engaging said opening in said arm on said valve.

6. The combination with a float chamber provided with an inlet and having a discharge port surrounded by a valve seat, a valve provided with laterally projecting pins disposed in alinement with one edge of the valve seat, a support having slot-like openings coacting with said pins to permit the tilting of the valve on the edge of the seat and limited movement of the valve away from said seat, and a thrust member on the float adapted to engage said valve centrally thereof.

7. The combination with a float chamber provided with an inlet and having a discharge port surrounded by a valve seat, a valve provided with laterally projecting pins disposed in alinement with one edge of the valve seat, a support having slot-like openings coacting with said pins to permit the tilting of the valve on the edge of the seat and limited movement of the valve away from said seat, and a float loosely connected to the end of the valve remote from said pins.

8. The combination with a float chamber provided with an inlet and having a discharge port surrounded by a valve seat, there being a recess in the face of said valve seat surrounding and communicating with said port, a disk valve provided with laterally projecting pins disposed in alinement with one edge of the valve seat, a support having slot-like openings coacting with said pins to permit the tilting of the valve on the edge of the seat and limited movement of the valve away from said seat, and a float loosely connected to the end of the valve remote from said pins.

9. The combination of a float chamber provided with a discharge valve seat, a float, a valve loosely mounted to fulcrum on one edge of said valve seat, an arm on said float loosely engaging the end of said valve opposite its fulcruming point, and a thrust member on said float coacting with said valve to facilitate the seating thereof.

10. The combination of a float chamber provided with a discharge valve seat, a float, a valve loosely mounted to fulcrum on one edge of said valve seat, and an arm on said float loosely engaging the end of said valve opposite its fulcruming point.

11. The combination of a float chamber provided with a discharge port surrounded by a downwardly facing valve seat, there being a recess in the face of the valve seat surrounding and communicating with said port, a flat faced valve mounted to tilt on said valve seat and for limited vertical movement bodily away from said valve seat, a float connected to said valve to open the same with a tilting movement on said valve seat, and a thrust member on said float adapted to facilitate the seating of the valve.

12. The combination of a float chamber provided with a discharge port surrounded by a downwardly facing valve seat, there being a recess in the face of the valve seat surrounding and communicating with said port, a flat faced valve mounted to tilt on said valve seat, and a float connected to said valve to open the same with a tilting movement on said valve seat.

13. The combination with a float chamber provided with an inlet, of a discharge valve seat, a valve loosely mounted to coact with and fulcruming on said valve seat, a float operatively connected to said valve, and a thrust member on said float adapted to engage said valve centrally thereof.

14. The combination with a float chamber provided with an inlet, of a discharge valve seat, a flat faced valve loosely mounted to coact with and fulcruming on said valve seat, and a float loosely connected to said valve to permit independent angular movement of the float and valve relative to each other.

15. The combination of a float chamber provided with a discharge valve seat having an annular recess in the face thereof, a valve coacting with said valve seat and adapted on the cracking of the valve to admit fluid to said recess, and a float operatively connected to said valve.

16. The combination of a float chamber, a downwardly facing discharge valve seat having a recess in the face thereof opening to a central discharge port, a flat faced valve loosely mounted to fulcrum on one edge of the valve seat, and a float connected to said valve opposite its fulcruming point.

17. The combination with a float chamber provided with an inlet, of a discharge valve seat, a flat faced valve coacting with said valve seat and fulcruming thereon, and a float loosely connected with said valve to permit independent angular movement of the float and valve relative to each other.

In witness whereof I have hereunto set my hand.

ADAM E. ARMSTRONG.